(12) United States Patent
Ogushi et al.

(10) Patent No.: US 10,781,734 B2
(45) Date of Patent: Sep. 22, 2020

(54) EXHAUST GAS CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Masataka Ogushi, Susono (JP); Keiichiro Aoki, Sunto-gun (JP); Toshihiro Mori, Gotemba (JP); Hiroshi Kobayashi, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/360,434

(22) Filed: Mar. 21, 2019

(65) Prior Publication Data
US 2019/0301330 A1    Oct. 3, 2019

(30) Foreign Application Priority Data
Mar. 30, 2018   (JP) .................................. 2018-066742

(51) Int. Cl.
*F01N 3/08*   (2006.01)
*B01D 53/94*   (2006.01)
(Continued)

(52) U.S. Cl.
CPC ....... *F01N 3/0814* (2013.01); *B01D 53/9418* (2013.01); *B01D 53/9422* (2013.01);
(Continued)

(58) Field of Classification Search
CPC ............ B01D 53/9418; B01D 53/9422; B01D 53/9431; B01D 53/9495; F01N 11/002;
(Continued)

(56) References Cited

U.S. PATENT DOCUMENTS 10,107,163 B2 * 10/2018 Shinoda ................. F01N 3/2073
2010/0107605 A1 * 5/2010 Brinkman .......... B01D 53/9477
60/274

(Continued)

FOREIGN PATENT DOCUMENTS

DE    102014105210 A1   5/2015
JP    2017-031960 A    2/2017

*Primary Examiner* — Anthony Ayala Delgado
(74) *Attorney, Agent, or Firm* — Oliff PLC (57) ABSTRACT

An exhaust gas control apparatus for an internal combustion engine includes a $NO_X$ storage reduction catalyst, a selective catalytic reduction catalyst, and an electronic control unit configured to shift an operation state of the engine from a rich operation state to a lean operation state, in a case where an acquired temperature of the $NO_X$ storage reduction catalyst is higher than a storage limit temperature, and an acquired $NH_3$ adsorption amount is equal to or larger than a lower limit adsorption amount when a lean operation restart request is made, and not to shift the operation state from the rich operation state to the lean operation state in a case where the acquired temperature of the $NO_X$ storage reduction catalyst is higher than the storage limit temperature and the acquired $NH_3$ adsorption amount is smaller than the lower limit adsorption amount when the lean operation restart request is made.

5 Claims, 6 Drawing Sheets

(51) Int. Cl.
  *F01N 3/20* (2006.01)
  *F02D 41/02* (2006.01)
  *F01N 13/00* (2010.01)
  *F01N 9/00* (2006.01)
  *F02D 41/14* (2006.01)
  *F01N 11/00* (2006.01)

(52) U.S. Cl.
  CPC ..... *B01D 53/9431* (2013.01); *B01D 53/9495* (2013.01); *F01N 3/0842* (2013.01); *F01N 3/0871* (2013.01); *F01N 3/208* (2013.01); *F01N 9/00* (2013.01); *F01N 13/009* (2014.06); *F02D 41/0235* (2013.01); *F02D 41/0275* (2013.01); *F01N 11/002* (2013.01); *F01N 2430/06* (2013.01); *F01N 2550/02* (2013.01); *F01N 2550/03* (2013.01); *F01N 2560/06* (2013.01); *F01N 2570/14* (2013.01); *F01N 2610/02* (2013.01); *F01N 2900/1402* (2013.01); *F01N 2900/1602* (2013.01); *F01N 2900/1614* (2013.01); *F01N 2900/1622* (2013.01); *F02D 41/1461* (2013.01); *F02D 2200/0802* (2013.01)

(58) Field of Classification Search
  CPC ............... F01N 13/009; F01N 2430/06; F01N 2550/02; F01N 2550/03; F01N 2560/06; F01N 2570/14; F01N 2610/02; F01N 2900/1402; F01N 2900/1602; F01N 2900/1614; F01N 2900/1622; F01N 3/0814; F01N 3/0842; F01N 3/0871; F01N 3/208; F01N 9/00; F02D 2200/0802; F02D 41/0235; F02D 41/0275; F02D 41/1461
  See application file for complete search history.

(56) References Cited

U.S. PATENT DOCUMENTS

| | | | |
|---|---|---|---|
| 2010/0115926 A1* | 5/2010 | Nagaoka | F01N 3/208 60/286 |
| 2015/0143798 A1 | 5/2015 | Lee | |
| 2016/0326933 A1* | 11/2016 | Shinoda | F02D 41/0275 |
| 2017/0037757 A1 | 2/2017 | Tanaka | |
| 2017/0044946 A1 | 2/2017 | Merlino et al. | |
| 2018/0038302 A1 | 2/2018 | Kanno et al. | |
| 2019/0293617 A1* | 9/2019 | Uchiyama | G01N 31/10 |

* cited by examiner

EXHAUST GAS CONTROL APPARATUS FOR INTERNAL COMBUSTION ENGINE

INCORPORATION BY REFERENCE

The disclosure of Japanese Patent Application No. 2018-066742 filed on Mar. 30, 2018 including the specification, drawings and abstract is incorporated herein by reference in its entirety.

BACKGROUND

1. Technical Field

The disclosure relates to an exhaust gas control apparatus for an internal combustion engine, the exhaust gas control apparatus including a $NO_X$ storage reduction (NSR) catalyst and a selective catalytic reduction (SCR) catalyst.

2. Description of Related Art

As an exhaust gas control apparatus for an internal combustion engine that performs lean combustion operation, an exhaust gas control apparatus including a three-way catalyst disposed in an exhaust passage; an NSR catalyst disposed downstream of the three-way catalyst in the exhaust passage; and an SCR catalyst disposed downstream of the NSR catalyst in the exhaust passage has been known. In addition, with regard to the exhaust gas control apparatus for the internal combustion engine as described above, the following technique has been proposed. In order to shift an operation state of the internal combustion engine from an operation state where an air-fuel ratio of exhaust gas is equal to or richer than a stoichiometric air-fuel ratio to an operation state where the air-fuel ratio of the exhaust gas is a lean air-fuel ratio that is leaner than the stoichiometric air-fuel ratio (hereinafter may be also described as "to restart lean operation"), initially, in a period until an $NH_3$ adsorption amount of the SCR catalyst reaches a target adsorption amount, the air-fuel ratio of the exhaust gas is regulated (adjusted) to a specified rich air-fuel ratio that is appropriate for producing $NH_3$ in the NSR catalyst or the three-way catalyst. Then, after the $NH_3$ adsorption amount of the SCR catalyst reaches the target adsorption amount, the operation state of the internal combustion engine is shifted from the operation state where the air-fuel ratio of the exhaust gas is the rich air-fuel ratio to the operation state where the air-fuel ratio of the exhaust gas is the lean air-fuel ratio (for example, see Japanese Patent Application Publication No. 2017-031960 (JP 2017-031960 A)).

SUMMARY

The target adsorption amount in the related art is determined by assuming that the NSR catalyst is in a state where the NSR catalyst can store $NO_X$ in the exhaust gas when the lean operation of the internal combustion engine is restarted. That is, the target adsorption amount is determined by assuming that a small amount of $NO_X$ that cannot be stored in the NSR catalyst is cleaned, i.e., reduced by the SCR catalyst when the lean operation of the internal combustion engine is restarted.

However, in the operation state where the air-fuel ratio of the exhaust gas is equal to or lower (richer) than the stoichiometric air-fuel ratio, a temperature of the exhaust gas discharged from the internal combustion engine tends to become high, and reaction heat ($NO_X$ reduction reaction heat or the like) generated in the NSR catalyst tends to be increased as compared to the operation state where the air-fuel ratio of the exhaust gas is the lean air-fuel ratio. Thus, a temperature of the NSR catalyst may exceed a temperature range within which the NSR catalyst can store $NO_X$ in the exhaust gas. In the case where the lean operation of the internal combustion engine is restarted in a state where the temperature of the NSR catalyst exceeds the temperature range, a large part of $NO_X$ discharged from the internal combustion engine is not stored in the NSR catalyst, and flows into the SCR catalyst. As a result, even when the target adsorption amount of $NH_3$ has been adsorbed on the SCR catalyst, an amount of $NO_X$ that is not cleaned, i.e., not reduced by the SCR catalyst is increased. This may result in degradation of exhaust emissions.

The disclosure provides an exhaust gas control apparatus for an internal combustion engine, which restrains degradation of exhaust emissions when lean operation of the internal combustion engine is restarted, the exhaust gas control apparatus including an NSR catalyst and an SCR catalyst.

An aspect of the disclosure relates to an exhaust gas control apparatus for an internal combustion engine. The exhaust gas control apparatus includes an NSR catalyst that is disposed in an exhaust passage of the internal combustion engine; and an SCR catalyst that is disposed downstream of the NSR catalyst in the exhaust passage. The exhaust gas control apparatus for the internal combustion engine includes an electronic control unit configured to restart lean operation of the internal combustion engine in a case where an $NH_3$ adsorption amount of the SCR catalyst is equal to or larger than an amount of $NH_3$ (hereinafter also referred to as a "lower limit adsorption amount") that is equivalent to an amount of $NO_X$ discharged from the internal combustion engine, and not to restart the lean operation of the internal combustion engine in a case where the $NH_3$ adsorption amount of the SCR catalyst is smaller than the lower limit adsorption amount, in a state where a temperature of the NSR catalyst is higher than an upper limit value (hereinafter also referred to as a "storage limit temperature") of a temperature range within which $NO_X$ in exhaust gas is able to be stored in the NSR catalyst when a lean operation restart request for the internal combustion engine is made.

An aspect of the disclosure relates to an exhaust gas control apparatus for an internal combustion engine The exhaust gas control apparatus includes a $NO_X$ storage reduction catalyst (NSR catalyst) that is disposed in an exhaust passage of the internal combustion engine, the $NO_X$ storage reduction catalyst being configured to store $NO_X$ in exhaust gas when an air-fuel ratio of the exhaust gas is a lean air-fuel ratio, and to reduce stored $NO_X$, with use of a reducing agent in the exhaust gas when the air-fuel ratio of the exhaust gas is a rich air-fuel ratio; a selective catalytic reduction catalyst (SCR catalyst) that is disposed downstream of the $NO_X$ storage reduction catalyst in the exhaust passage, the selective catalytic reduction catalyst being configured to adsorb $NH_3$ in the exhaust gas, and to use adsorbed $NH_3$ as the reducing agent so as to reduce $NO_X$ in the exhaust gas; and an electronic control unit configured i) to acquire a temperature of the $NO_X$ storage reduction catalyst, ii) to acquire an $NH_3$ adsorption amount that is an amount of $NH_3$ adsorbed on the selective catalytic reduction catalyst, iii) to shift an operation state of the internal combustion engine from a rich operation state in which air-fuel mixture at the rich air-fuel ratio is burned to a lean operation state in which the air-fuel mixture at the lean air-fuel ratio is burned, in a case where the acquired temperature of the $NO_X$ storage reduction catalyst is higher than a storage limit temperature, and the acquired $NH_3$ adsorption amount is equal to or larger than a lower limit adsorption amount when a lean operation restart request to shift the operation state of the internal combustion engine from the rich operation state to the lean operation state is made, the storage limit temperature being an upper limit value of a temperature range within which $NO_X$ in the exhaust gas is stored by the $NO_X$ storage reduction catalyst, and the lower limit adsorption amount being an amount of $NH_3$ equivalent to an amount of $NO_X$ discharged from the internal combustion engine, and iv) not to shift the operation state of the internal combustion engine from the rich operation state to the lean operation state in a case where the acquired temperature of the $NO_X$ storage reduction catalyst is higher than the storage limit temperature and the acquired $NH_3$ adsorption amount is smaller than the lower limit adsorption amount when the lean operation restart request is made.

For example, in the case where the operation state of the internal combustion engine is shifted from the lean operation state to the rich operation state for a purpose of cleaning, i.e., reducing $NO_X$ stored in the NSR catalyst, the air-fuel ratio of the exhaust gas flowing into the NSR catalyst is changed from the lean air-fuel ratio to the rich air-fuel ratio due to the shifting of the operation state of the internal combustion engine. Thus, $NO_X$ stored in the NSR catalyst is desorbed from the NSR catalyst, and desorbed $NO_X$ reacts with unburned fuel components (HC, CO, and the like) in the exhaust gas and is reduced to nitrogen ($N_2$), ammonium ($NH_3$), and so on. When $NO_X$ stored in the NSR catalyst is thus reduced such that a $NO_X$ storage amount of the NSR catalyst substantially becomes zero, the lean operation restart request is made to shift the operation state of the internal combustion engine from the rich operation state to the lean operation state.

In the case where a reduction reaction of $NO_X$ stored in the NSR catalyst occurs due to the rich operation of the internal combustion engine, the temperature of the NSR catalyst is increased by reaction heat. Thus, it is assumed that the temperature of the NSR catalyst at the time when the lean operation restart request is made is higher than the storage limit temperature. In the case where the operation state of the internal combustion engine is shifted from the rich operation state to the lean operation state in the state where the temperature of the NSR catalyst is higher than the storage limit temperature, a large part of $NO_X$ discharged from the internal combustion engine is not stored in the NSR catalyst and flows into the SCR catalyst. At this time, in the case where an amount of $NH_3$ adsorbed on the SCR catalyst (i.e., the $NH_3$ adsorption amount of the SCR catalyst) is equal to or larger than the lower limit adsorption amount, $NO_X$ discharged from the internal combustion engine is cleaned, i.e., reduced by the SCR catalyst. However, in the case where the temperature of the NSR catalyst is higher than the storage limit temperature, and the $NH_3$ adsorption amount of the SCR catalyst is smaller than the lower limit adsorption amount when the operation state of the internal combustion engine is returned (shifted) from the rich operation state to the lean operation state, a part of $NO_X$ that is not stored in the NSR catalyst and flows into the SCR catalyst is not cleaned, i.e., not reduced by the SCR catalyst and discharged to the atmosphere, as described above.

In contrast, in the exhaust gas control apparatus for the internal combustion engine according to the aspect of the disclosure, in the case where the temperature of the NSR catalyst is higher than the storage limit temperature and the $NH_3$ adsorption amount of the SCR catalyst is smaller than the lower limit adsorption amount when the lean operation restart request is made, the operation state of the internal combustion engine is not shifted from the rich operation state to the lean operation state. In this way, $NO_X$ discharged from the internal combustion engine is cleaned, i.e., reduced by three-way activation capability of the NSR catalyst. Thus, an increase in the amount of $NO_X$ discharged to the atmosphere can be restrained. Here, in the case where the rich operation of the internal combustion engine continues, $NH_3$ that is produced at the time when $NO_X$ is reduced by the NSR catalyst is supplied to the SCR catalyst. Thus, the $NH_3$ adsorption amount of the SCR catalyst is increased. Then, when the $NH_3$ adsorption amount of the SCR catalyst becomes equal to or larger than the lower limit adsorption amount, the operation state of the internal combustion engine is shifted from the rich operation state to the lean operation state. In this case, the large part of $NO_X$ discharged from the internal combustion engine is not stored in the NSR catalyst and flows into the SCR catalyst. However, $NH_3$ adsorbed on the SCR catalyst is used as the reducing agent, and thus $NO_X$ can be cleaned, i.e., reduced. As a result, when the operation state of the internal combustion engine is shifted from the rich operation state to the lean operation state, the increase in the amount of $NO_X$ discharged to the atmosphere is restrained.

In the exhaust gas control apparatus for the internal combustion engine according to the aspect of the disclosure, in the case where the temperature of the NSR catalyst is higher than the storage limit temperature and the $NH_3$ adsorption amount of the SCR catalyst is equal to or larger than the lower limit adsorption amount at the time when the lean operation restart request is made, the operation state of the internal combustion engine is promptly shifted from the rich operation state to the lean operation state. Then, $NO_X$, which is not stored in the NSR catalyst and flows into the SCR catalyst at the time when the operation state of the internal combustion engine is shifted from the rich operation state to the lean operation state, is cleaned, i.e., reduced by the SCR catalyst. Thus, the increase in the amount of $NO_X$ discharged to the atmosphere is restrained.

Thus, with the exhaust gas control apparatus for the internal combustion engine according to the aspect of the disclosure, the increase in the amount of $NO_X$ discharged to the atmosphere is restrained, and therefore, degradation of exhaust emissions is restrained when the lean operation of the internal combustion engine is restarted.

In the exhaust gas control apparatus for the internal combustion engine according to the aspect, the electronic control unit may be configured to shift the operation state of the internal combustion engine from the rich operation state to the lean operation state in a case where the acquired temperature of the $NO_X$ storage reduction catalyst is equal to or lower than the storage limit temperature when the lean operation restart request is made. In the case where the temperature of the NSR catalyst is equal to or lower than the storage limit temperature when the operation state of the internal combustion engine is shifted from the rich operation state to the lean operation state, $NO_X$ discharged from the internal combustion engine is stored in the NSR catalyst. Thus, when the operation state of the internal combustion engine is returned (shifted) from the rich operation state to the lean operation state, the increase in the amount of $NO_X$ discharged to the atmosphere is restrained.

Here, when the concentration of hydrocarbon in the exhaust gas flowing into the NSR catalyst is low (the concentration of oxygen is high), nitric monoxide (NO) contained in the exhaust gas is oxidized on the NSR catalyst. In this way, highly reactive $NO_X$ (hereinafter may be also referred to as "active $NO_X$") is produced. When active $NO_X$, which is thus produced, continues to be exposed to oxygen excess atmosphere, active $NO_X$ is oxidized. At this time, in the case where the temperature of the NSR catalyst is equal to or lower than the storage limit temperature, active $NO_X$ is adsorbed on the NSR catalyst. In the case where a reducing intermediate, which will be described below, is produced before active $NO_X$ is oxidized, active $NO_X$ reacts with the reducing intermediate and is thus reduced to $N_2$. The reducing intermediate described herein means a highly reducing intermediate that is produced when radical hydrocarbon and active $NO_X$ react with each other. Radical hydrocarbon is produced when the concentration of hydrocarbon in the exhaust gas flowing into the NSR catalyst is high, and hydrocarbon in the exhaust gas is partially oxidized in the NSR catalyst. Thus, in the case where the concentration of hydrocarbon in the exhaust gas is increased intermittently in a cycle shorter than a time required to oxidize active $NO_X$, the reduction reaction of active $NO_X$ with the use of the reducing intermediate can be continuously caused. Further, in the case of $NO_X$ reduction based on the above-described mechanism, $NO_X$ in the exhaust gas does not need to be stored in the NSR catalyst. Thus, $NO_X$ reduction based on the above-described mechanism occurs even when the temperature of the NSR catalyst is higher than the storage limit temperature.

Thus, it is considered to adopt a configuration in which the operation state of the internal combustion engine is shifted from the rich operation state to the lean operation state, and fuel is supplied to the exhaust gas from a fuel supply valve such that the concentration of hydrocarbon in the exhaust gas flowing into the NSR catalyst fluctuates with a specified amplitude and in a specified cycle even in the state where the temperature of the NSR catalyst is higher than the storage limit temperature and the $NH_3$ adsorption amount of the SCR catalyst is smaller than the lower limit adsorption amount when the lean operation restart request is made. The "specified amplitude" described herein is an amplitude that makes it possible to achieve the concentration of hydrocarbon that makes it possible to produce the reducing intermediate, and to cause active $NO_X$ to react with the reducing intermediate without storing active $NO_X$ in the NSR catalyst. In addition, the "specified cycle" is a cycle that is shorter than a time required for active $NO_X$ to be oxidized.

In the case where the temperature of the NSR catalyst becomes higher to some extent than the storage limit temperature, the intermittent fuel supply operation performed by the fuel supply valve becomes insufficient with respect to an oxidation rate of active $NO_X$. As a result, the amount of $NO_X$ that is not cleaned, i.e., not reduced by the NSR catalyst may be increased. In addition, in the case where the amount of $NO_X$ discharged from the internal combustion engine is increased to some extent, the amount of $NO_X$ that is not cleaned, i.e., not reduced by the NSR catalyst may be increased even when the concentration of hydrocarbon in the exhaust gas flowing into the NSR catalyst fluctuates with the specified amplitude and in the specified cycle.

The exhaust gas control apparatus for the internal combustion engine according to the aspect may further include a fuel supply valve that is disposed upstream of the $NO_X$ storage reduction catalyst in the exhaust passage, the fuel supply valve being configured to supply fuel to the exhaust gas flowing through the exhaust passage. The electronic control unit may be configured to control a fuel supply amount and fuel supply timing of the fuel supply valve, and to shift the operation state of the internal combustion engine from the rich operation state to the lean operation state and to control the fuel supply valve such that a concentration of hydrocarbon in the exhaust gas flowing into the $NO_X$ storage reduction catalyst fluctuates with a specified amplitude and in a specified cycle in a case where the acquired temperature of the $NO_X$ storage reduction catalyst is equal to or lower than a specified threshold that is higher than the storage limit temperature, and the amount of $NO_X$ discharged from the internal combustion engine is equal to or smaller than a specified amount, even in a state where the acquired temperature of the $NO_X$ storage reduction catalyst is higher than the storage limit temperature and the acquired $NH_3$ adsorption amount is smaller than the lower limit adsorption amount when the lean operation restart request is made. With the configuration, even in the case where the temperature of the NSR catalyst is higher than the storage limit temperature and the $NH_3$ adsorption amount of the SCR catalyst is smaller than the lower limit adsorption amount, the operation state of the internal combustion engine can be shifted from the rich operation state to the lean operation state while the increase in the amount of $NO_X$ discharged to the atmosphere is restrained.

Note that the "specified threshold" is, for example, a temperature of the NSR catalyst or a temperature obtained by subtracting a specified margin from the temperature of the NSR catalyst, and the "specified threshold" is set such that the intermittent fuel supply operation performed by the fuel supply valve is assumed to become insufficient with respect to the oxidation rate of active $NO_X$ when the temperature of the NSR catalyst becomes higher than the specified threshold. In addition, the "specified amount" is, for example, the maximum $NO_X$ amount or an amount obtained by subtracting a specified margin from the maximum $NO_X$ amount, the maximum $NO_X$ amount being the maximum amount of $NO_X$ that is able to be cleaned, i.e., reduced by the NSR catalyst when the fuel supply valve is controlled such that the concentration of hydrocarbon in the exhaust gas flowing into the NSR catalyst fluctuates with the specified amplitude and in the specified cycle.

The exhaust gas control apparatus for the internal combustion engine according to the aspect may further include a $NO_X$ sensor that is disposed between the $NO_X$ storage reduction catalyst and the selective catalytic reduction catalyst in the exhaust passage, the $NO_X$ sensor being configured to detect a concentration of $NO_X$ in the exhaust gas flowing into the exhaust passage. The electronic control unit may be configured to acquire the $NH_3$ adsorption amount of the selective catalytic reduction catalyst based on a detection value of the $NO_X$ sensor.

According to the aspect of the disclosure, it is possible to provide the exhaust gas control apparatus for the internal combustion engine, which restrains the degradation of the exhaust emissions when the lean operation of the internal combustion engine is restarted, the exhaust gas control apparatus including the NSR catalyst and the SCR catalyst.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A description will hereinafter be made on specific embodiments of the disclosure with reference to the drawings. Dimensions, materials, shapes, relative arrangement, and the like of components described in these embodiments are not intended to limit the technical scope of the disclosure thereto unless otherwise noted.

First Embodiment

Figure 1:
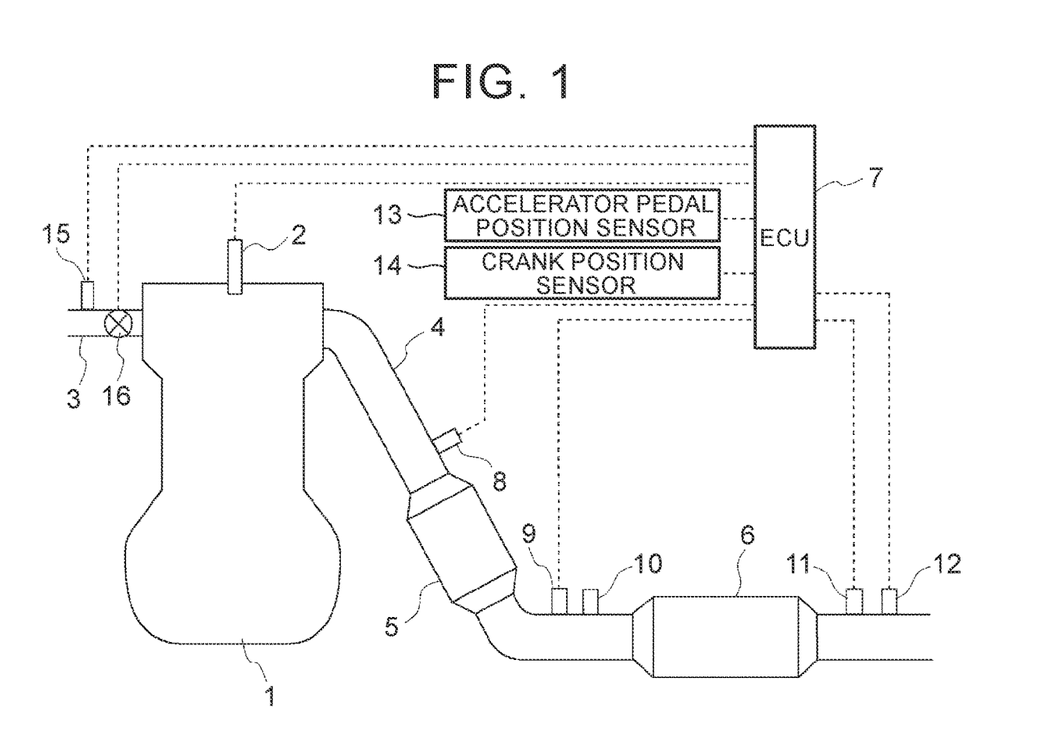
FIG. 1 is a schematic configuration diagram of an internal combustion engine, to which the disclosure is applied, and intake and exhaust systems of the internal combustion engine in a first embodiment.

A description will now be provided on a first embodiment of the disclosure with reference to FIG. 1 to FIG. 5. FIG. 1 is a schematic configuration diagram of an internal combustion engine, to which the disclosure is applied, and intake and exhaust systems of the internal combustion engine.

An internal combustion engine 1 shown in FIG. 1 is an internal combustion engine of a compression-ignition type using light oil as fuel (a diesel engine). The internal combustion engine 1 may be an internal combustion engine of a spark-ignition type capable of performing a lean operation (a gasoline engine).

The internal combustion engine 1 includes a fuel injection valve 2 that injects the light oil as the fuel into an unillustrated cylinder. An intake passage 3 and an exhaust passage 4 are connected to the internal combustion engine 1. The intake passage 3 is a passage through which fresh air (air) introduced from the atmosphere is delivered to the internal combustion engine 1. In an intermediate portion of the intake passage 3, an intake throttle valve 16 is disposed. The intake throttle valve 16 is configured to regulate (adjust) a flow rate of the fresh air flowing through the intake passage 3 by changing a cross-sectional area of the intake passage 3. The exhaust passage 4 is a passage through which burned gas (exhaust gas) discharged from the cylinder flows. A first catalyst casing 5 is disposed in an intermediate portion of the exhaust passage 4. A second catalyst casing 6 is disposed downstream of the first catalyst casing 5 in the exhaust passage 4.

The first catalyst casing 5 is a cylindrical casing. In the first catalyst casing 5, a catalyst carrier (i.e., a catalyst support) that carries (supports) a $NO_X$ storage reduction (NSR) catalyst is accommodated. For example, the catalyst carrier includes a honeycomb structure that is coated with a coat layer made of alumina or the like; noble metal (platinum (Pt), palladium (Pd), or the like) carried (supported) by the coat layer; a promotor (co-catalyst) such as ceria ($CeO_2$) carried by the coat layer; and a $NO_X$ storage material (a basic layer of alkali(s), an alkaline-earth element(s), or the like) carried by the coat layer. When an air-fuel ratio of the exhaust gas is a lean air-fuel ratio, the NSR catalyst stores $NO_X$ in the exhaust gas. When the air-fuel ratio of the exhaust gas is a rich air-fuel ratio, the NSR catalyst releases stored $NO_X$ and causes $NO_X$ to react with unburned fuel components (HC, CO, and the like) in the exhaust gas. In this way, $NO_X$ is reduced (converted) to $N_2$.

In the second catalyst casing 6 is a cylindrical casing. In the second catalyst casing 6, a catalyst carrier that carries a selective catalytic reduction (SCR) catalyst is accommodated. For example, the catalyst carrier is formed by coating a monolith-type base material having a honeycomb-shaped transverse section with a zeolitic catalyst carrier. The catalyst carrier carries a transition metal element such as Cu or Fe after ion exchange. The SCR catalyst adsorbs a reducing agent contained in the exhaust gas and uses the adsorbed reducing agent to reduce (convert) $NO_X$ in the exhaust gas to $N_2$.

An ECU 7 is also provided for the internal combustion engine 1 configured as described above. The ECU 7 is an electronic control unit including a Central Processor Unit (CPU), Read Only Memory (ROM), Random Access Memory (RAM), backup RAM, and the like. The ECU 7 is electrically connected to various sensors including a first exhaust temperature sensor 8, a first $NO_X$ sensor 9, a second exhaust temperature sensor 10, a second $NO_X$ sensor 11, a third exhaust temperature sensor 12, an accelerator pedal position sensor 13, a crank position sensor 14, an airflow meter 15, and the like, and receives measurement values of the various sensors (i.e., values measured by the various sensors).

The first exhaust temperature sensor 8 is disposed upstream of the first catalyst casing 5 in the exhaust passage 4 and outputs an electric signal correlated with the temperature of the exhaust gas flowing into the NSR catalyst. The first $NO_X$ sensor 9 is disposed between the first catalyst casing 5 and the second catalyst casing 6 in the exhaust passage 4 and outputs an electric signal correlated with $NO_X$ concentration of the exhaust gas flowing out of the NSR catalyst. The second exhaust temperature sensor 10 is disposed between the first catalyst casing 5 and the second catalyst casing 6 in the exhaust passage 4 and outputs an electric signal correlated with the temperature of the exhaust gas flowing out of the NSR catalyst (i.e., the exhaust gas flowing into the SCR catalyst). The second $NO_X$ sensor 11 is disposed downstream of the second catalyst casing 6 in the exhaust passage 4 and outputs an electric signal correlated with $NO_X$ concentration of the exhaust gas flowing out of the SCR catalyst. The third exhaust temperature sensor 12 is disposed downstream of the second catalyst casing 6 in the exhaust passage 4 and outputs an electric signal correlated with the temperature of the exhaust gas flowing out of the SCR catalyst. The accelerator pedal position sensor 13 outputs an electric signal correlated with an operation amount of an unillustrated accelerator pedal (an accelerator pedal operation amount). The crank position sensor 14 outputs an electric signal correlated with a rotational position of an engine output shaft (a crankshaft) of the internal combustion engine 1. The airflow meter 15 is disposed upstream of the intake throttle valve 16 in the intake passage 3 and outputs an electric signal correlated with an amount (mass) of the fresh air (the air) suctioned into the cylinder of the internal combustion engine 1.

In addition to the above-described various sensors, various devices such as the fuel injection valve 2 and the intake throttle valve 16 are electrically connected to the ECU 7, and the ECU 7 can control the various devices. For example, the ECU 7 controls a fuel injection amount and fuel injection timing of the fuel injection valve 2 (i.e., an amount of fuel injected by the fuel injection valve 2 and timing of fuel injection performed by the fuel injection valve 2) on the basis of an engine load calculated from the measurement value of the accelerator pedal position sensor 13 and an engine speed calculated from the measurement value of the crank position sensor 14. In the case where the operation state of the internal combustion engine 1 is in a low-load operation region or an intermediate-load operation region, the ECU 7 controls an opening degree of the intake throttle valve 16 such that an air-fuel ratio of air-fuel mixture to be burned in the cylinder becomes the lean air-fuel ratio that is leaner than a stoichiometric air-fuel ratio. In this way, the internal combustion engine 1 performs the lean operation. In the case where the operation state of the internal combustion engine 1 is in a high-load operation region, the ECU 7 controls the opening degree of the intake throttle valve 16 such that the air-fuel ratio of the air-fuel mixture to be burned in the cylinder becomes the rich air-fuel ratio that is richer than the stoichiometric air-fuel ratio. In this way, the internal combustion engine 1 performs a rich operation. Furthermore, in the case where the internal combustion engine 1 performs the lean operation, the ECU 7 executes processing to reduce and clean $NO_X$ stored in the NSR catalyst (hereinafter may be also described as "catalyst regeneration processing") by causing the internal combustion engine 1 to temporarily perform the rich operation such that the exhaust gas at the rich air-fuel ratio containing the unburned fuel components flows into the first catalyst casing 5. The catalyst regeneration processing is executed, for example, when a $NO_X$ storage amount of the NSR catalyst (i.e., an amount of $NO_X$ stored in the NSR catalyst) becomes equal to or larger than a certain amount, or when a time period in which lean operation is performed after termination of the last catalyst regeneration processing becomes equal to or longer than a specified time period.

In the case where the operation state of the internal combustion engine 1 is shifted from the low or intermediate-load operation region to the high-load operation region, or the catalyst regeneration processing is executed during the lean operation of the internal combustion engine 1, the air-fuel ratio of the exhaust gas flowing into the NSR catalyst of the first catalyst casing 5 is changed from the lean air-fuel ratio to the rich air-fuel ratio. Thus, as described above, $NO_X$ stored in the NSR catalyst is desorbed from the NSR catalyst and reacts with the unburned fuel components in the exhaust gas. In this way, $NO_X$ is reduced to $N_2$, $NH_3$, and the like. Then, $NH_3$ produced in the NSR catalyst flows with the exhaust gas into the second catalyst casing 6 and is adsorbed on the SCR catalyst. Thereafter, $NH_3$ adsorbed on the SCR catalyst is used to reduce a small amount of $NO_X$ that passes through the NSR catalyst during the lean operation of the internal combustion engine 1, a small amount of $NO_X$ that is leaked from the NSR catalyst immediately after initiation of the catalyst regeneration processing, and the like.

Figure 2:
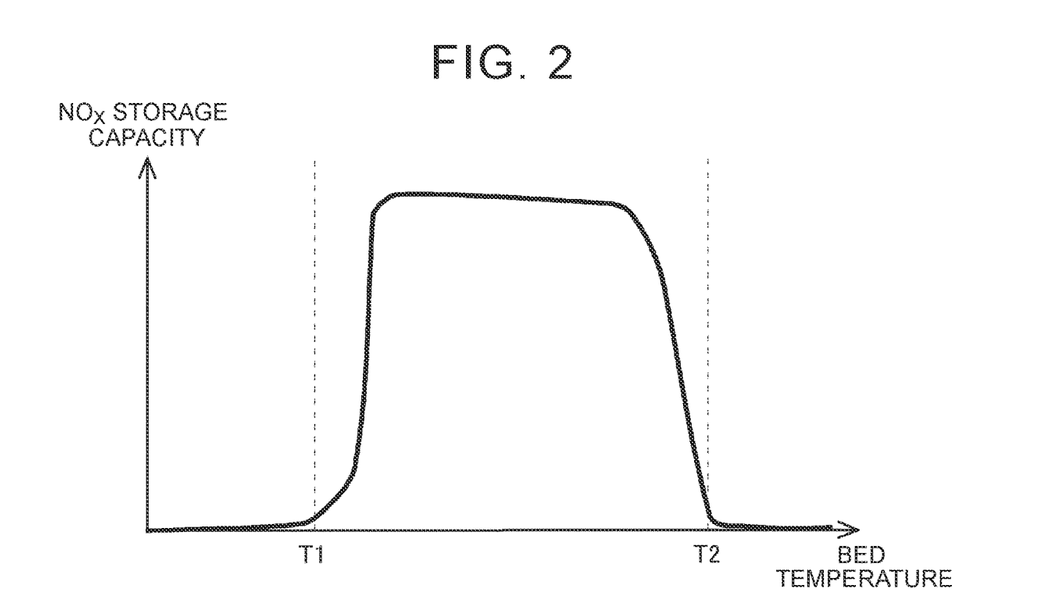
FIG. 2 is a graph illustrating a correlation between a bed temperature of an NSR catalyst and $NO_X$ storage capacity of the NSR catalyst.

In the case where the internal combustion engine 1 performs the rich operation, for example, in the case where the operation state of the internal combustion engine 1 is in the high-load operation region or in the case where the catalyst regeneration processing is executed, an amount of heat transferred from the exhaust gas to the NSR catalyst is increased, and an amount of reaction heat generated in the NSR catalyst is increased, and thus, the temperature of the NSR catalyst tends to be increased. FIG. 2 shows a relationship between a bed temperature of the NSR catalyst and $NO_X$ storage capacity (a $NO_X$ storage volume) of the NSR catalyst. As shown in FIG. 2, the $NO_X$ storage capacity of the NSR catalyst appears when the bed temperature of the NSR catalyst is in a specified temperature range (a temperature range from T1 to T2 in FIG. 2). Accordingly, in the case where the bed temperature of the NSR catalyst exceeds an upper limit value (a storage limit temperature) T2 of the above-described specified temperature range during the rich operation of the internal combustion engine 1, when the operation state of the internal combustion engine 1 is shifted from the rich operation state to the lean operation state, $NO_X$ discharged from the internal combustion engine 1 may not be stored in the NSR catalyst. At the time, unless a relatively large amount of $NH_3$, with which substantially the entire amount of $NO_X$ discharged from the internal combustion engine 1 can be reduced, is adsorbed on the SCR catalyst, the amount of $NO_X$ that is not cleaned (i.e., reduced) by the NSR catalyst and the SCR catalyst is increased. As a result, the amount of $NO_X$ discharged into the atmosphere is increased.

Thus, in this embodiment, in the case where the operation state of the internal combustion engine 1 needs to be shifted from the rich operation state to the lean operation state (in the case where a lean operation restart request (i.e., a request to restart the lean operation) is made), the operation state of the internal combustion engine 1 is not shifted from the rich operation state to the lean operation state when the bed temperature of the NSR catalyst is higher than the storage limit temperature and an $NH_3$ adsorption amount of the SCR catalyst (i.e., an amount of $NH_3$ adsorbed on the SCR catalyst) is smaller than a lower limit adsorption amount. Examples of the state where the operation state of the internal combustion engine 1 needs to be shifted from the rich operation state to the lean operation state include the case where the operation state of the internal combustion engine 1 is shifted from the high-load operation region to the low or intermediate-load operation region, and the case where a termination condition for the catalyst regeneration processing (for example, a condition that the $NO_X$ storage amount of the NSR catalyst becomes substantially zero, or a condition that a time period in which the catalyst regeneration processing is executed becomes equal to or longer than a specified time period) is satisfied. The "lower limit adsorption amount" described herein is the $NH_3$ adsorption amount (the amount of adsorbed $NH_3$) equivalent to the amount of $NO_X$ discharged from the internal combustion engine 1, that is, a minimum $NH_3$ amount required to reduce $NO_X$ discharged from the internal combustion engine 1, or an amount obtained by adding a specified margin to the minimum $NH_3$ amount. Since the amount of $NO_X$ discharged from the internal combustion engine 1 correlates with the fuel injection amount and the air-fuel ratio of the air-fuel mixture, the lower limit adsorption amount may be set with the use of the fuel injection amount and the air-fuel ratio of the air-fuel mixture as parameters.

Figure 3:
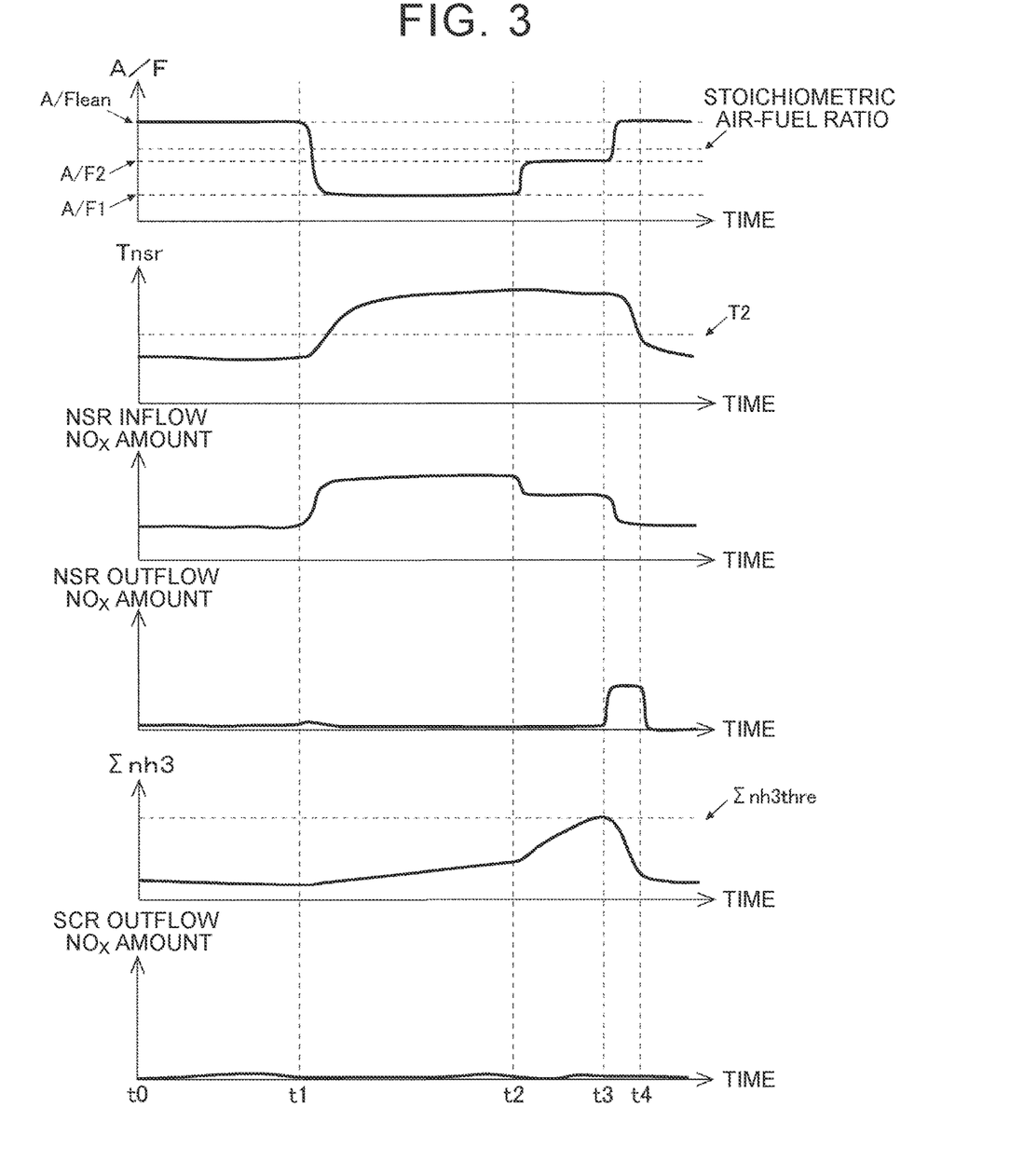
FIG. 3 is a timing chart illustrating time-based changes in an air-fuel ratio (A/F) of air-fuel mixture, a bed temperature (Tnsr) of the NSR catalyst, an amount of $NO_X$ flowing into the NSR catalyst (an NSR inflow $NO_X$ amount), an amount of $NO_X$ flowing out of the NSR catalyst (an NSR outflow $NO_X$ amount), an $NH_3$ adsorption amount (Σnh3) of an SCR catalyst, and an amount of $NO_X$ flowing out of the SCR catalyst (an SCR outflow $NO_X$ amount) in the first embodiment.

FIG. 3 is a timing chart illustrating time-based changes in the air-fuel ratio (A/F) of the air-fuel mixture, the bed temperature (Tnsr) of the NSR catalyst, the amount of $NO_X$ flowing into the NSR catalyst (an NSR inflow $NO_X$ amount), the amount of $NO_X$ flowing out of the NSR catalyst (an NSR outflow $NO_X$ amount), the $NH_3$ adsorption amount ($\Sigma$nh3) of the SCR catalyst, and the amount of $NO_X$ flowing out of the SCR catalyst (an SCR outflow $NO_X$ amount).

In a period from t0 to t1 in FIG. 3, the operation state of the internal combustion engine 1 is in the low or intermediate-load operation region. Thus, the internal combustion engine 1 is operated with the air-fuel mixture at a lean air-fuel ratio A/Flean (i.e., the internal combustion engine 1 performs the lean operation). In this way, the air-fuel ratio of the exhaust gas flowing into the first catalyst casing 5 is also the lean air-fuel ratio A/Flean equal to that of the air-fuel mixture. In the state where the air-fuel ratio of the exhaust gas flowing into the first catalyst casing 5 is the lean air-fuel ratio A/Flean, $NO_X$ reduction reaction hardly occurs in the NSR catalyst. Thus, the bed temperature Tnsr of the NSR catalyst remains equal to or lower than the storage limit temperature. As a result, substantially the entire amount of $NO_X$ discharged from the internal combustion engine 1 is adsorbed on the NSR catalyst. Thus, the NSR outflow $NO_X$ amount is substantially zero. In addition, in the above-described period from t0 to t1, $NH_3$ is not produced due to absence of the $NO_X$ reduction reaction in the NSR catalyst, and the NSR outflow $NO_X$ amount is substantially zero. Thus, the $NH_3$ adsorption amount of the SCR catalyst remains a substantially constant amount, and the SCR outflow $NO_X$ amount remains substantially zero.

At t1 in FIG. 3, the operation state of the internal combustion engine 1 is shifted from the low or intermediate-load operation region to the high-load operation region, or the catalyst regeneration processing is initiated. Then, the air-fuel ratio A/F of the air-fuel mixture is changed from the lean air-fuel ratio A/Flean to a specified rich air-fuel ratio A/F1. As a result, the operation state of the internal combustion engine 1 is shifted from the lean operation state to the rich operation state. When the air-fuel ratio A/F of the air-fuel mixture is changed from the lean air-fuel ratio A/Flean to the specified rich air-fuel ratio A/F1, the fuel injection amount is determined to generate requested torque of the internal combustion engine 1, and the opening degree of the intake throttle valve 16 is determined such that the air-fuel ratio A/F of the air-fuel mixture becomes the specified rich air-fuel ratio A/F1. In this way, while the requested torque of the internal combustion engine 1 is generated, the air-fuel ratio A/F of the air-fuel mixture can be changed to the specified rich air-fuel ratio A/F1. The specified rich air-fuel ratio A/F1 described herein is the air-fuel ratio that is appropriate for the reduction of $NO_X$ stored in the NSR catalyst, and is set in advance on the basis of an experiment result, a simulation result, or the like.

When the air-fuel ratio A/F of the air-fuel mixture is changed from the lean air-fuel ratio A/Flean to the specified rich air-fuel ratio A/F1 (t1 in FIG. 3) by the above-described method, the air-fuel ratio of the exhaust gas flowing into the first catalyst casing 5 also becomes the rich air-fuel ratio A/F1 equal to the rich air-fuel ratio A/F1 of the air-fuel mixture due to the change in the air-fuel ratio A/F of the air-fuel mixture. As a result, $NO_X$ stored in the NSR catalyst in the previous lean operation is desorbed from the NSR catalyst, reacts with the unburned fuel components in the exhaust gas, and is reduced to (converted to) $N_2$ and $NH_3$. Meanwhile, when the air-fuel ratio of the exhaust gas is changed from the lean air-fuel ratio A/Flean to the specified rich air-fuel ratio A/F1, the NSR inflow $NO_X$ amount is increased. However, due to action between three-way activation capability of the NSR catalyst and the unburned fuel components in the exhaust gas, $NO_X$ that flows into the NSR catalyst during the rich operation of the internal combustion engine 1 is also reduced to $N_2$ and $NH_3$. As a result, the NSR outflow $NO_X$ amount during the rich operation of the internal combustion engine 1 becomes substantially zero. Furthermore, $NH_3$, which is produced by the reduction reaction of $NO_X$ in the NSR catalyst, flows with the exhaust gas into the second catalyst casing 6 and is adsorbed on the SCR catalyst. As a result, the $NH_3$ adsorption amount $\Sigma$nh3 of the SCR catalyst is increased. During the rich operation of the internal combustion engine 1, the reduction reaction of $NO_X$ stored in the NSR catalyst and $NO_X$ flowing into the NSR catalyst occurs. As a result, the temperature of the NSR catalyst is increased by the reaction heat.

Thereafter, when the operation state of the internal combustion engine 1 is shifted from the high-load operation region to the low or intermediate-load operation region, or the termination condition for the catalyst regeneration processing is satisfied (t2 in FIG. 3), the lean operation restart request is made. In the example shown in FIG. 3, at a time point when the lean operation restart request is made, the bed temperature Tnsr of the NSR catalyst is higher than the above-described storage limit temperature T2, and the $NH_3$ adsorption amount $\Sigma$nh3 of the SCR catalyst is smaller than the above-described lower limit adsorption amount ($\Sigma$nh3thre in FIG. 3). Thus, at the time point when the lean operation restart request is made (t2 in FIG. 3), the operation state of the internal combustion engine 1 is not shifted from the rich operation state to the lean operation state, and the rich operation of the internal combustion engine 1 continues. Here, in the rich operation after the lean operation restart request is made, the air-fuel ratio A/F of the air-fuel mixture is set to a slightly rich air-fuel ratio A/F2 that is closer to the stoichiometric air-fuel ratio than the rich air-fuel ratio A/F1 appropriate for the reduction of $NO_X$. The slightly rich air-fuel ratio A/F2 described herein is the air-fuel ratio that is appropriate for producing $NH_3$ from $NO_X$ in the NSR catalyst, and is set in advance on the basis of an experiment result, a simulation result, or the like. Since the air-fuel ratio A/F of the air-fuel mixture is set to the slightly rich air-fuel ratio A/F2, when the rich operation of the internal combustion engine 1 continues, $NO_X$ in the exhaust gas is efficiently reduced to $NH_3$ due to action between the three-way activation capability of the NSR catalyst and the unburned fuel components in the exhaust gas. As a result, the bed temperature Tnsr of the NSR catalyst becomes less likely to become equal to or lower than the storage limit temperature T2. However, the $NH_3$ adsorption amount $\Sigma$nh3 of the SCR catalyst can be effectively increased while the NSR outflow $NO_X$ amount is maintained to be substantially zero. Here, in a configuration in which a supply valve, such as a urea supply valve, configured to supply an additive such as $NH_3$ or a precursor of $NH_3$ is separately provided between the first catalyst casing 5 and the second catalyst casing 6 in the exhaust passage 4, the additive may be supplied from the supply valve when the internal combustion engine 1 performs the rich operation with the use of the air-fuel mixture at the slightly rich air-fuel ratio A/F2. In this way, the $NH_3$ adsorption amount $\Sigma nh3$ of the SCR catalyst may be promptly increased.

When the $NH_3$ adsorption amount $\Sigma nh3$ of the SCR catalyst is increased to be equal to or higher than the lower limit adsorption amount $\Sigma nh3thre$ due to the rich operation of the internal combustion engine 1 with the use of the air-fuel mixture at the slightly rich air-fuel ratio A/F2 (t3 in FIG. 3), the air-fuel ratio A/F of the air-fuel mixture is changed from the slightly rich air-fuel ratio A/F2 to the lean air-fuel ratio A/Flean. As a result, the operation state of the internal combustion engine 1 is shifted from the rich operation state to the lean operation state. Immediately after the operation state of the internal combustion engine 1 is shifted from the rich operation state to the lean operation state, the bed temperature Tnsr of the NSR catalyst is higher than the storage limit temperature T2. Thus, a large part of $NO_X$ discharged from the internal combustion engine 1 is not adsorbed on the NSR catalyst. As a result, the NSR outflow $NO_X$ amount is increased. However, since an amount of $NH_3$ that has been adsorbed on the SCR catalyst is equal to or larger than the lower limit adsorption amount $\Sigma nh3thre$, $NO_X$ that is not stored in the NSR catalyst reacts with $NH_3$ in the SCR catalyst and thus is reduced (converted) to $N_2$. As a result, the SCR outflow $NO_X$ amount can be maintained to be substantially zero. As described above, when $NO_X$ that is not stored in the NSR catalyst is cleaned, i.e., reduced by the SCR catalyst, the $NH_3$ adsorption amount $\Sigma nh3$ of the SCR catalyst is decreased. When the internal combustion engine 1 performs the lean operation, the reduction reaction of $NO_X$ hardly occurs in the NSR catalyst, and the temperature of the exhaust gas discharged from the internal combustion engine 1 is low. Thus, the bed temperature Tnsr of the NSR catalyst is promptly lowered. Thereafter, when the bed temperature Tnsr of the NSR catalyst becomes equal to or lower than the storage limit temperature T2 (t4 in FIG. 3), $NO_X$ discharged from the internal combustion engine 1 is stored in the NSR catalyst. As a result, the NSR outflow $NO_X$ amount becomes substantially zero, and accordingly, a decrease in the $NH_3$ adsorption amount $\Sigma nh3$ of the SCR catalyst is restrained.

In the case where the operation state of the internal combustion engine 1 is controlled by the above-described procedure shown in FIG. 3, an increase in the amount of $NO_X$ discharged to the atmosphere can be restrained, and the operation state of the internal combustion engine 1 can be shifted from the rich operation state to the lean operation state even when the bed temperature Tnsr of the NSR catalyst is higher than the storage limit temperature T2 and the $NH_3$ adsorption amount $\Sigma nh3$ of the SCR catalyst is smaller than the lower limit adsorption amount $\Sigma nh3thre$ at the time when the lean operation restart request is made. In the case where the $NH_3$ adsorption amount $\Sigma nh3$ of the SCR catalyst is equal to or larger than the lower limit adsorption amount $\Sigma nh3thre$ at the time point when the lean operation restart request is made, the operation state of the internal combustion engine 1 may be shifted from the rich operation state to the lean operation state without executing the processing in the period from t2 to t3 in FIG. 3 (i.e., without executing the processing to cause the internal combustion engine 1 to perform the rich operation with the use of the air-fuel mixture at the slightly rich air-fuel ratio A/F2). In this case as well, $NO_X$ that is not stored in the NSR catalyst is cleaned, i.e., reduced by the SCR catalyst. Thus, the SCR outflow $NO_X$ amount can be maintained to be substantially zero. Also, in the case where the bed temperature Tnsr of the NSR catalyst is equal to or lower than the storage limit temperature T2 at the time point when the lean operation restart request is made, the operation state of the internal combustion engine 1 may be shifted from the rich operation state to the lean operation state without executing the processing in the period from t2 to t3 in FIG. 3. In this case, $NO_X$ discharged from the internal combustion engine 1 is stored in the NSR catalyst. Thus, the NSR outflow $NO_X$ amount becomes substantially zero, and accordingly, the SCR outflow $NO_X$ amount is maintained to be substantially zero.

Figure 4:
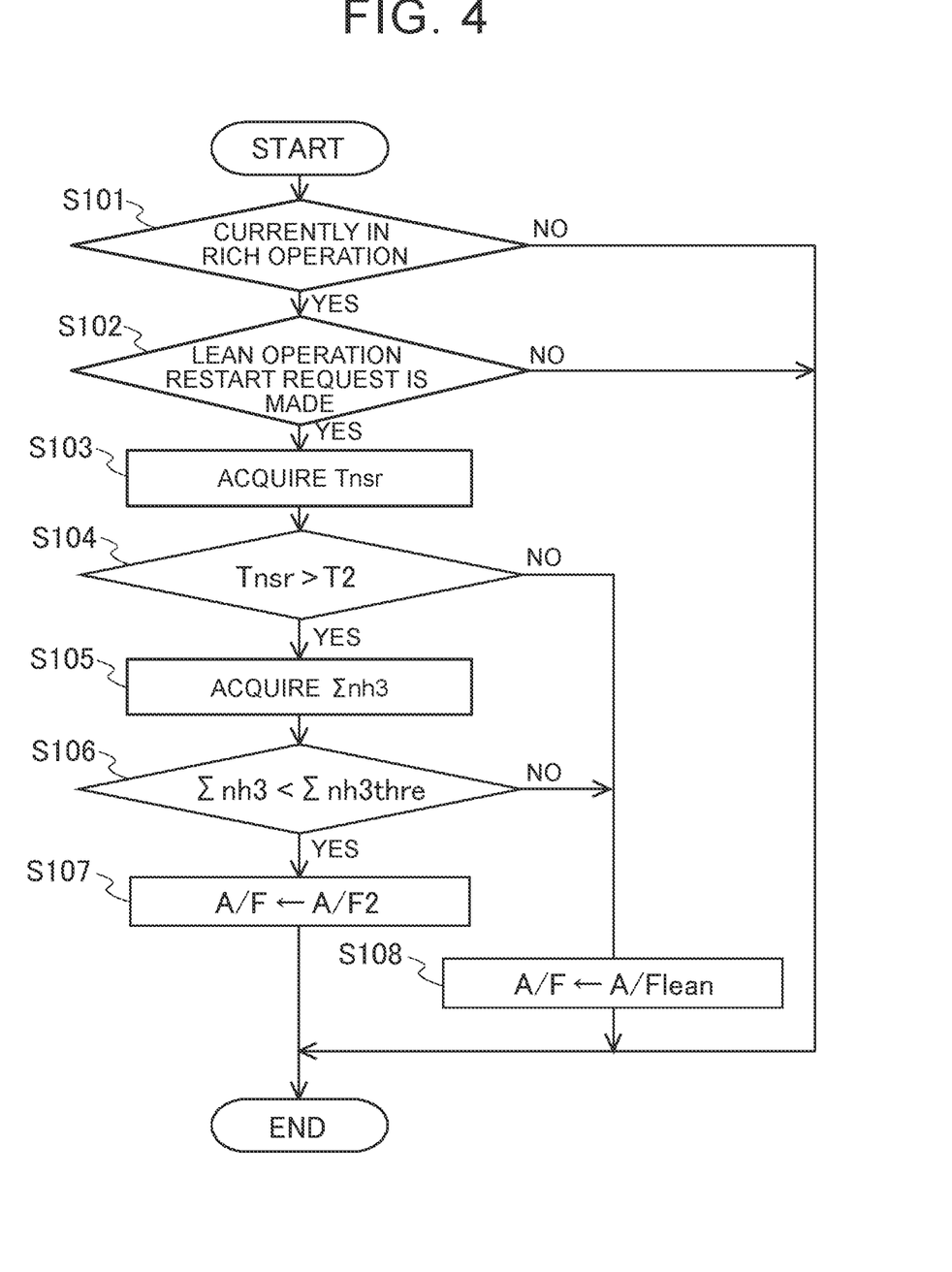
FIG. 4 is a flowchart of a processing routine that is executed by an ECU when an operation state of the internal combustion engine is shifted from a rich operation state to a lean operation state in the first embodiment.

A description will be hereinafter provided on a procedure of restarting the lean operation of the internal combustion engine 1 in this embodiment with reference to FIG. 4. FIG. 4 is a flowchart of a processing routine that is executed by the ECU 7 when the operation state of the internal combustion engine 1 is shifted from the rich operation state to the lean operation state. This processing routine is a processing routine that is repeatedly executed by the ECU 7 when the internal combustion engine 1 performs the rich operation, and is stored in the ROM or the like of the ECU 7 in advance.

In the processing routine in FIG. 4, in processing of S101, the ECU 7 initially determines whether the internal combustion engine 1 currently performs the rich operation. If a negative determination is made in the processing of S101 (i.e., if the internal combustion engine 1 currently performs the lean operation), the ECU 7 terminates execution of this processing routine. On the other hand, if a positive determination is made in the processing of S101, the processing proceeds to S102.

In the processing of S102, the ECU 7 determines whether the lean operation restart request is made. The phrase "the lean operation restart request is made" described herein means, for example, the state where the operation state of the internal combustion engine 1 is shifted from the high-load operation region to the low or intermediate-load operation region or the state where the termination condition for the catalyst regeneration processing is satisfied as described above. If a negative determination is made in the processing of S102, the ECU 7 terminates the execution of this processing routine. On the other hand, if a positive determination is made in the processing of S102, the processing proceeds to S103.

In the processing of S103, the ECU 7 acquires the bed temperature Tnsr of the NSR catalyst. For example, the ECU 7 acquires the bed temperature Tnsr of the NSR catalyst by estimating the bed temperature Tnsr of the NSR catalyst from at least one of the measurement values of the first exhaust temperature sensor 8 and the second exhaust temperature sensor 10. The "temperature acquisition unit" according to the disclosure is realized by the execution of the processing of S103 by the ECU 7.

In processing of S104, the ECU 7 determines whether the bed temperature Tnsr acquired in the processing of S103 is higher than the storage limit temperature T2. As described above, the "storage limit temperature T2" described herein is an upper limit value of a bed temperature range where the NSR catalyst can store $NO_X$ in the exhaust gas. More specifically, the "storage limit temperature T2" is the upper limit value of the bed temperature Tnsr at which the $NO_X$ storage capacity of the NSR catalyst becomes equal to or larger than the amount of $NO_X$ discharged from the internal combustion engine 1. If a negative determination is made in the processing of S104 (Tnsr≤T2), the NSR catalyst can store $NO_X$ discharged from the internal combustion engine 1 even when the operation state of the internal combustion engine 1 is shifted from the rich operation state to the lean operation state. Thus, if the negative determination is made in the processing of S104, the processing proceeds to S108, and the air-fuel ratio A/F of the air-fuel mixture is changed from the rich air-fuel ratio A/F1 to the specified lean air-fuel ratio A/Flean. Thus, the operation state of the internal combustion engine 1 is shifted from the rich operation state to the lean operation state. On the other hand, if a positive determination is made in the processing of S104 (Tnsr>T2), the NSR catalyst cannot store $NO_X$ discharged from the internal combustion engine 1 if the operation state of the internal combustion engine 1 is shifted from the rich operation state to the lean operation state. Thus, if the positive determination is made in the processing of S104, the processing proceeds to S105.

Figure 5:
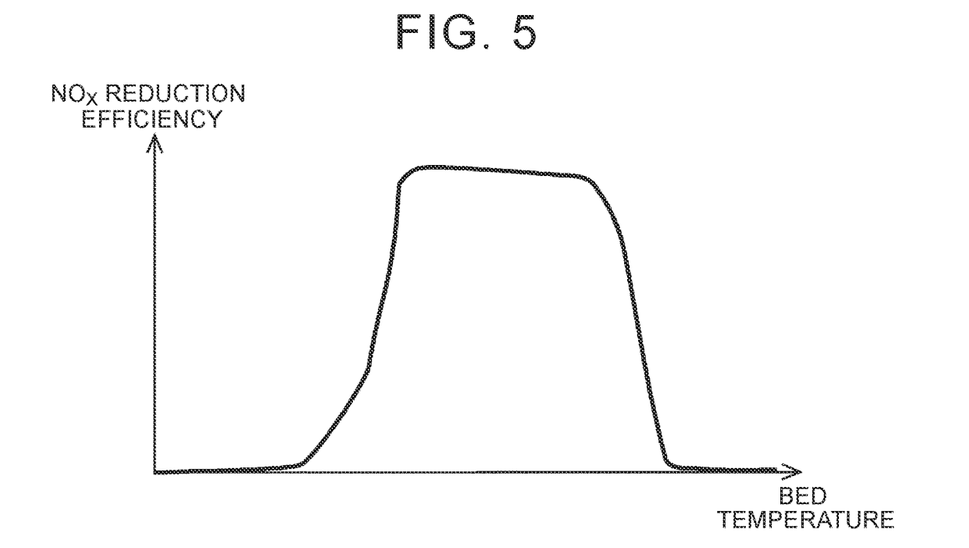
FIG. 5 is a graph illustrating a correlation between the bed temperature of the NSR catalyst and $NO_X$ reduction efficiency of the NSR catalyst.

In the processing of S105, the ECU 7 acquires the $NH_3$ adsorption amount Σnh3 of the SCR catalyst. At this time, the ECU 7 may acquire the $NH_3$ adsorption amount Σnh3 of the SCR catalyst by reading the $NH_3$ adsorption amount Σnh3 that is calculated in another processing routine or the like. As a method of calculating the $NH_3$ adsorption amount Σnh3 of the SCR catalyst, for example, a method of integrating a difference between an amount of $NH_3$ supplied from the NSR catalyst to the SCR catalyst and an amount of $NH_3$ consumed by the SCR catalyst to reduce $NO_X$ can be used. In this case, the amount of $NH_3$ supplied from the NSR catalyst to the SCR catalyst can be calculated from the measurement value of the first $NO_X$ sensor 9 and the exhaust gas flow rate (a total of an air intake amount measured by the airflow meter 15 and an amount of fuel injected by the fuel injection valve 2) at the time of the rich operation of the internal combustion engine 1. The above-described method uses a property of the $NO_X$ sensor to react to $NH_3$ in addition to $NO_X$ in the exhaust gas. However, the exhaust gas discharged from the NSR catalyst during the rich operation of the internal combustion engine 1 may include a small amount of $NO_X$ in addition to $NH_3$. Accordingly, the amount of $NH_3$ supplied from the NSR catalyst to the SCR catalyst may be calculated by calculating the amount of $NO_X$ flowing out of the NSR catalyst (the NSR outflow $NO_X$ amount) during the rich operation of the internal combustion engine 1 and subtracting the NSR outflow $NO_X$ amount from a total amount of $NO_X$ and $NH_3$ calculated from the measurement value of the first $NO_X$ sensor 9 and the exhaust gas flow rate. In this case, the amount of $NO_X$ discharged from the NSR catalyst (the NSR outflow $NO_X$ amount) during the rich operation of the internal combustion engine 1 can be calculated from the amount of $NO_X$ flowing into the NSR catalyst (the NSR inflow $NO_X$ amount) and $NO_X$ reduction efficiency of the NSR catalyst. The NSR inflow $NO_X$ amount may be estimated from the operation state of the internal combustion engine 1 or may be calculated from a measurement value of another $NO_X$ sensor provided upstream of the first catalyst casing 5 in the exhaust passage 4 and the exhaust gas flow rate. As shown in FIG. 5, the $NO_X$ reduction efficiency of the NSR catalyst correlates with the bed temperature Tnsr of the NSR catalyst. Accordingly, the correlation between the bed temperature Tnsr of the NSR catalyst and the $NO_X$ reduction efficiency of the NSR catalyst is defined in advance in the form of a map or a relational expression. Then, the $NO_X$ reduction efficiency of the NSR catalyst may be derived from the map or the relational expression with the use of the bed temperature Tnsr of the NSR catalyst as an argument. Another $NH_3$ sensor may be provided between the first catalyst casing 5 and the second catalyst casing 6 in the exhaust passage 4 so as to calculate the amount of $NH_3$ supplied from the NSR catalyst to the SCR catalyst on the basis of the measurement value of the $NH_3$ sensor and the exhaust gas flow rate. Meanwhile, the amount of $NH_3$ consumed in the SCR catalyst to reduce $NO_X$ can be acquired by calculating the $NH_3$ amount equivalent to the NSR outflow $NO_X$ amount. As described above, the "$NH_3$ adsorption amount acquisition unit" according to the disclosure is realized by the execution of the processing of S105 by the ECU 7.

After the ECU 7 finishes executing the processing of S105, the processing proceeds to S106. In the processing of S106, the ECU 7 determines whether the $NH_3$ adsorption amount Σnh3 acquired in the processing of S105 is equal to or larger than the lower limit adsorption amount Σnh3thre. The "lower limit adsorption amount Σnh3thre" described herein is the $NH_3$ adsorption amount that is equivalent to the amount of $NO_X$ discharged from the internal combustion engine 1 or the amount obtained by adding the specified margin to the $NH_3$ adsorption amount as described above. If a negative determination is made in the processing of S106 (Σnh3<Σnh3thre), $NO_X$ discharged from the internal combustion engine 1 can be cleaned, i.e., reduced by the SCR catalyst when the internal combustion engine 1 is shifted from the rich operation state to the lean operation state. Thus, if the negative determination is made in the processing of S106, the ECU 7 executes processing of S108. On the other hand, in the case where a positive determination is made in the processing of S106 (Σnh3<Σnh3thre), if the operation state of the internal combustion engine 1 is shifted from the rich operation state to the lean operation state, there is a possibility that $NO_X$ discharged from the internal combustion engine 1 cannot be entirely cleaned (reduced) by the SCR catalyst. Thus, if the positive determination is made in the processing of S106, the processing proceeds to S107.

In the processing of S107, the ECU 7 causes the rich operation of the internal combustion engine 1 to continue by changing the air-fuel ratio A/F of the air-fuel mixture from the rich air-fuel ratio A/F1 to the slightly rich air-fuel ratio A/F2. The "slightly rich air-fuel ratio A/F2" described herein is the air-fuel ratio appropriate for producing $NH_3$ from $NO_X$ in the NSR catalyst as described above. In this case, as in the period from t2 to t3 shown in FIG. 3, $NH_3$ is efficiency produced by the NSR catalyst. Thus, the $NH_3$ adsorption amount Σnh3 of the SCR catalyst can be effectively increased. In the case where the $NH_3$ adsorption amount Σnh3 of the SCR catalyst has been increased to be equal to or larger than the lower limit adsorption amount Σnh3thre, the positive determination is made in the processing of S106, and processing of S108 is executed when this processing routine is executed from next time onward. As a result, in the case where the operation state of the internal combustion engine 1 is shifted from the rich operation state to the lean operation state, $NO_X$ discharged from the internal combustion engine 1 is not stored in the NSR catalyst, but $NO_X$ is cleaned, i.e., reduced by the SCR catalyst. Thus, the increase in the amount of $NO_X$ discharged to the atmosphere can be restrained.

The "control unit" according to the disclosure is realized by the execution of the processing of S101 to S102, S104, S106 to S108 by the ECU 7.

According to the embodiment that has been described so far, when the operation state of the internal combustion engine 1 is returned (shifted) from the rich operation state to the lean operation state, the increase in the $NO_X$ amount discharged to the atmosphere can be restrained. Therefore, degradation of exhaust emissions can be restrained.

Second Embodiment

Figure 6:
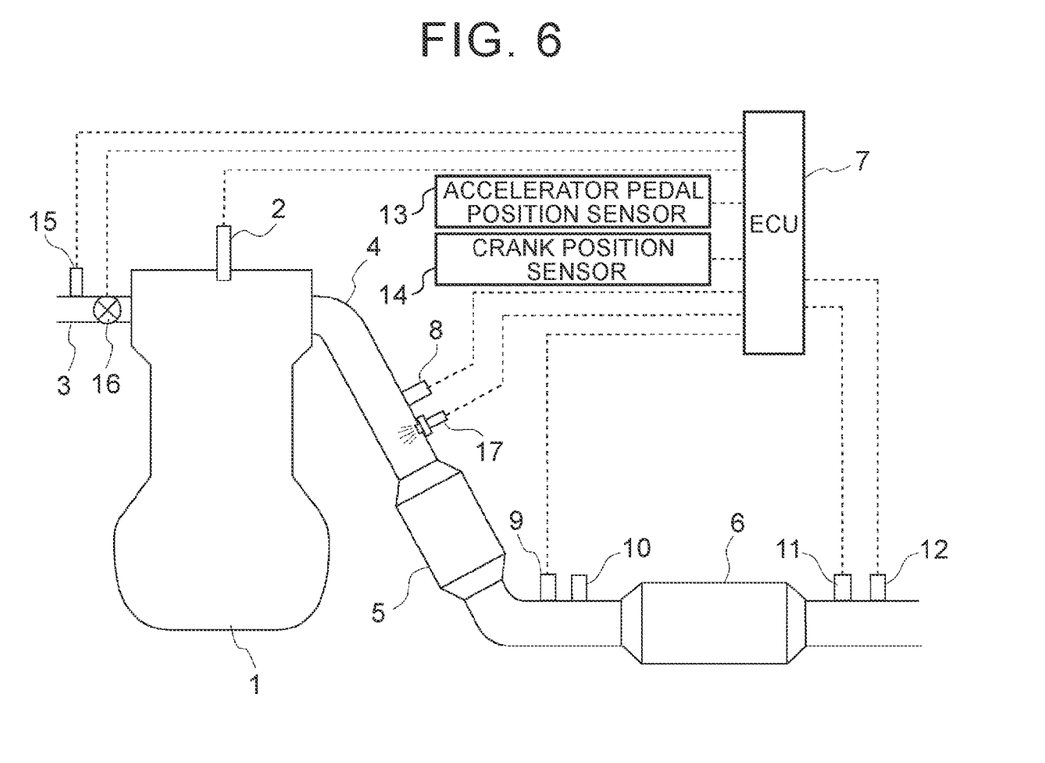
FIG. 6 is a schematic configuration diagram of an internal combustion engine, to which the disclosure is applied, and intake and exhaust systems of the internal combustion engine in a second embodiment.
Figure 7:
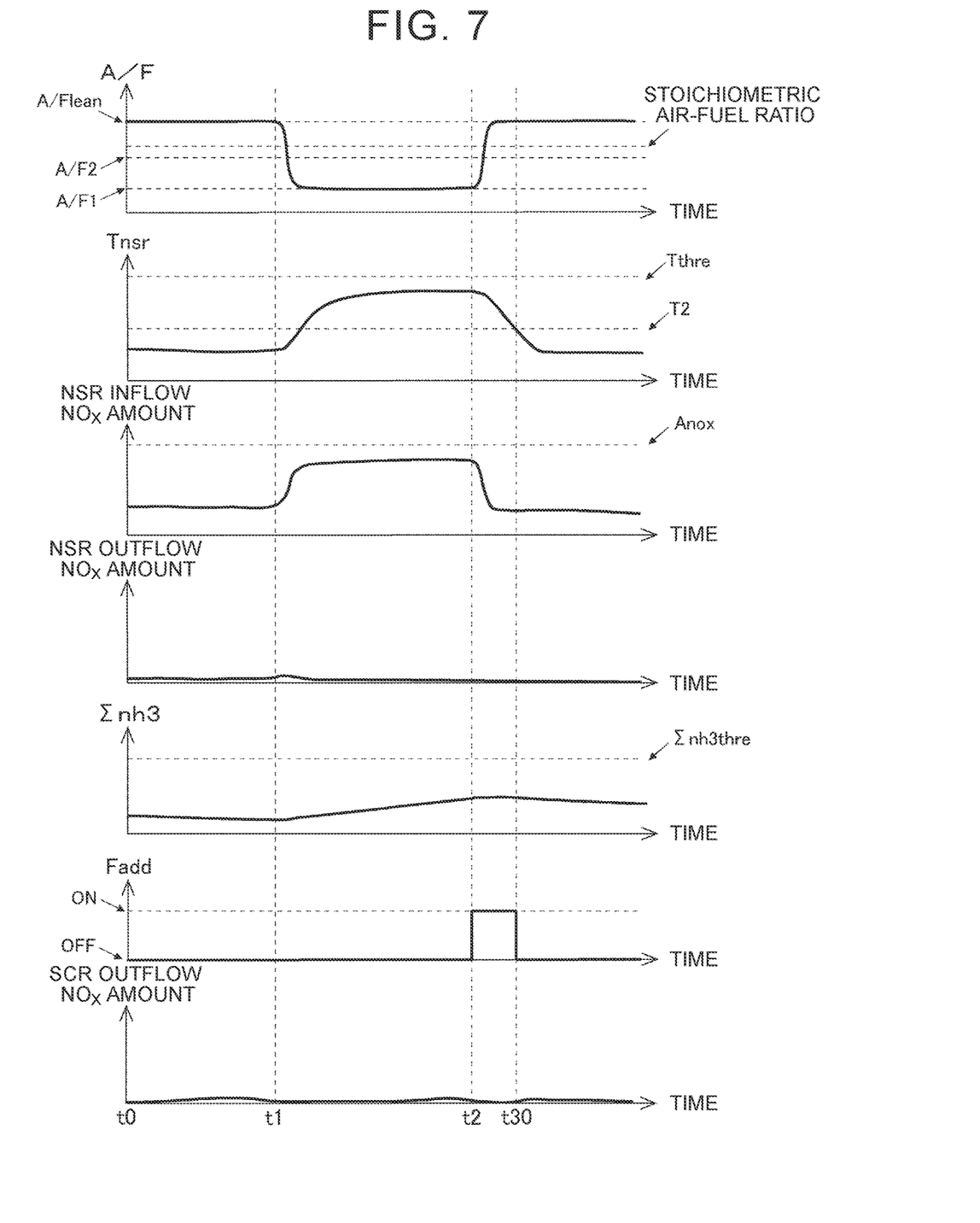
FIG. 7 is a timing chart illustrating time-based changes in the air-fuel ratio (A/F) of the air-fuel mixture, the bed temperature (Tnsr) of the NSR catalyst, the amount of $NO_X$ flowing into the NSR catalyst (the NSR inflow $NO_X$ amount), the amount of $NO_X$ flowing out of the NSR catalyst (the NSR outflow $NO_X$ amount), the $NH_3$ adsorption amount (Σnh3) of the SCR catalyst, and a fuel supply flag (Fadd), and the amount of $NO_X$ flowing out of the SCR catalyst (the SCR outflow $NO_X$ amount) in the second embodiment.
Figure 8:
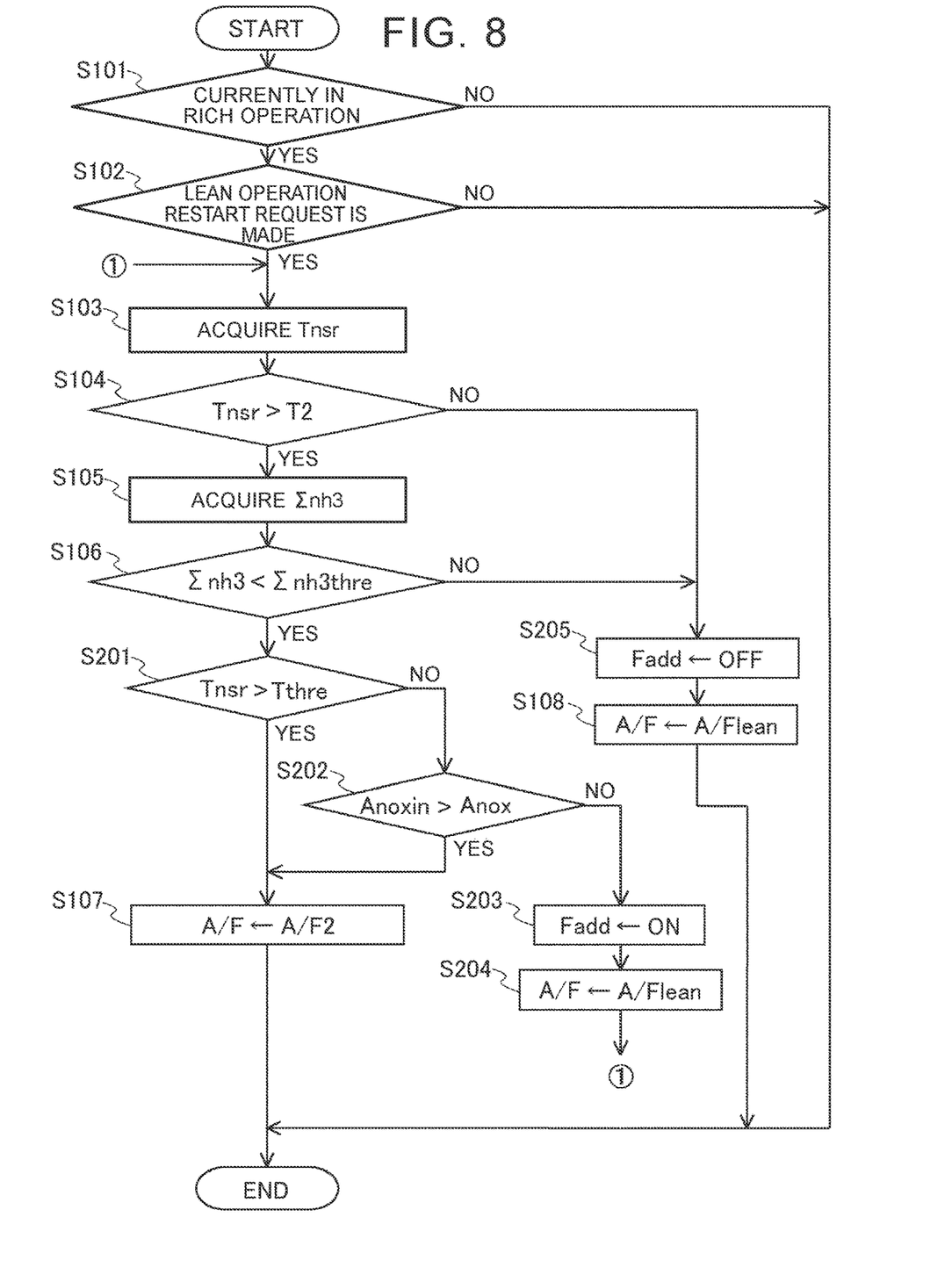
FIG. 8 is a flowchart of a processing routine that is executed by the ECU when the operation state of the internal combustion engine is shifted from the rich operation state to the lean operation state in the second embodiment.

Next, a description will be provided on a second embodiment of the disclosure with reference to FIG. 6 to FIG. 8.

Here, a description will be provided on a configuration different from the configuration in the first embodiment, and a description on a configuration that is the same as the configuration in the first embodiment will not be provided.

In the first embodiment, the internal combustion engine 1 does not restart the lean operation and performs the rich operation at the slightly rich air-fuel ratio A/F2 in the case where the bed temperature Tnsr of the NSR catalyst is higher than the storage limit temperature T2 and the $NH_3$ adsorption amount Σnh3 of the SCR catalyst is smaller than the lower limit adsorption amount Σnh3thre at the time when the lean operation restart request of the internal combustion engine 1 is made. In this embodiment, even in the case where the bed temperature Tnsr of the NSR catalyst is higher than the storage limit temperature T2 and the $NH_3$ adsorption amount Σnh3 of the SCR catalyst is smaller than the lower limit adsorption amount Σnh3thre at the time when the lean operation restart request for the internal combustion engine 1 is made, fuel supply processing is executed and the lean operation of the internal combustion engine 1 is restarted as long as $NO_X$ in the exhaust gas can be reduced by the fuel supply processing.

FIG. 6 is a schematic configuration diagram of an internal combustion engine, to which the disclosure is applied, and intake and exhaust systems of the internal combustion engine in this embodiment. In this embodiment, as shown in FIG. 6, a fuel supply valve 17 configured to supply the fuel to the exhaust gas flowing through the exhaust passage is provided upstream of the first catalyst casing 5 in the exhaust passage 4. The ECU 7 controls fuel supply timing for the fuel supply valve 17 and an amount of fuel supplied by the fuel supply valve 17. The other configurations are the same as those in the first embodiment.

Here, in the case where concentration of hydrocarbon in the exhaust gas flowing into the NSR catalyst is low (in the case where concentration of oxygen is high), NO contained in the exhaust gas is oxidized on the NSR catalyst. As a result, highly reactive $NO_X$ (active $NO_X$) such as $NO_3$ or $NO_2$ is produced. In the case where active $NO_X$ continues to be exposed to the oxygen excess atmosphere, active $NO_X$ is oxidized. At this time, in the case where the bed temperature Tnsr of the NSR catalyst is equal to or lower than the storage limit temperature T2, active $NO_X$ in the form of nitrate ion $NO_3$ is stored in the NSR catalyst. In the case where a reducing intermediate is produced before active $NO_X$ is changed to $NO_3$, active $NO_X$ reacts with the reducing intermediate and thus is reduced to $N_2$. The reducing intermediate described herein is R—NCO, R—$NH_2$, or the like that is produced when radical hydrocarbon reacts with active $NO_X$. Radical hydrocarbon is produced by partially oxidizing hydrocarbon in the exhaust gas in the NSR catalyst when the concentration of hydrocarbon in the exhaust gas flowing into the NSR catalyst is high. Thus, in the case where the concentration of hydrocarbon in the exhaust gas is intermittently increased in a cycle shorter than a time required for the active $NO_X$ to be changed to nitrate ion $NO_3^-$, the reduction reaction of the active $NO_X$ with the use of the reducing intermediate can be continuously caused. Further, in the case of $NO_X$ reduction based on the above-described mechanism, $NO_X$ in the exhaust gas does not need to be stored in the NSR catalyst. Thus, $NO_X$ reduction based on the above-described mechanism occurs even when the bed temperature Tnsr of the NSR catalyst is higher than the storage limit temperature T2.

Accordingly, the following method is considered. In the case where the bed temperature Tnsr of the NSR catalyst is higher than the storage limit temperature T2, and the $NH_3$ adsorption amount Σnh3 of the SCR catalyst is smaller than the lower limit adsorption amount Σnh3thre at the time when the lean operation restart request for the internal combustion engine 1 is made, the fuel supply valve 17 is controlled such that the concentration of hydrocarbon in the exhaust gas flowing into the NSR catalyst fluctuates with a specified amplitude and in a specified cycle, and the operation state of the internal combustion engine 1 is returned (shifted) from the rich operation state to the lean operation state. The "specified amplitude" described herein is an amplitude that makes it possible to achieve the concentration of hydrocarbon that makes it possible to produce the reducing intermediate and to cause the active $NO_X$ to react with the reducing intermediate without changing the active $NO_X$ to nitrate ion $NO_3$. The "specified cycle" is a cycle that is shorter than a time required for the active $NO_X$ to be changed to nitrate ion $NO_3^-$.

However, in the case where the bed temperature Tnsr of the NSR catalyst becomes higher to some extent than the storage limit temperature T2, a rate of change from the active $NO_X$ to nitrate ion $NO_3^-$ is increased. As a result, an intermittent fuel supply operation performed by the fuel supply valve 17 may become insufficient with respect to the change rate. In such a case, the amount of $NO_X$ that is not cleaned, i.e., not reduced by the NSR catalyst may be increased. In addition, in the case where the amount of $NO_X$ discharged from the internal combustion engine 1 is increased to certain extent, the amount of $NO_X$ that is not reduced by the NSR catalyst may be increased even when the concentration of hydrocarbon in the exhaust gas flowing into the NSR catalyst fluctuates with the specified amplitude and in the specified cycle.

Thus, in this embodiment, even in the state where the bed temperature Tnsr of the NSR catalyst is higher than the storage limit temperature T2 and the $NH_3$ adsorption amount Σnh3 of the SCR catalyst is smaller than the lower limit adsorption amount Σnh3thre at the time when the lean operation restart request for the internal combustion engine 1 is made, the fuel supply valve 17 is controlled such that the concentration of hydrocarbon in the exhaust gas flowing into the NSR catalyst fluctuates with the specified amplitude and in the specified cycle, and the operation state of the internal combustion engine 1 is returned (shifted) from the rich operation state to the lean operation state, in a case where the bed temperature Tnsr of the NSR catalyst is equal to or lower than a specified threshold Tthre and the amount of $NO_X$ discharged from the internal combustion engine 1 (the NSR inflow $NO_X$ amount) is equal to or smaller than a specified amount Anox. The "specified threshold Tthre" described herein is a bed temperature of the NSR catalyst or a temperature obtained by subtracting a specified margin from the bed temperature of the NSR catalyst, and the "specified threshold Tthre" is set such that the intermittent fuel supply operation performed by the fuel supply valve 17 is assumed to become insufficient with respect to the rate of change from active $NO_X$ to nitrate ion $NO_3$ when the bed temperature Tnsr of the NSR catalyst becomes higher than the specified threshold Tthre. The "specified amount Anox" is a maximum $NO_X$ amount or an amount obtained by subtracting a specified margin from the maximum $NO_X$ amount, the maximum $NO_X$ amount being the maximum amount of $NO_X$ that can be cleaned, i.e., reduced by the NSR catalyst when the fuel supply valve 17 is controlled such that the concentration of hydrocarbon in the exhaust gas flowing into the NSR catalyst fluctuates with the specified amplitude and in the specified cycle. The maximum $NO_X$ amount (the maximum amount of $NO_X$), which can be cleaned, i.e., reduced by the NSR catalyst when the fuel supply valve 17 is controlled such that the concentration of hydrocarbon in the exhaust gas flowing into the NSR catalyst fluctuates with the specified amplitude and in the specified cycle, tends to decrease as the bed temperature Tnsr of the NSR catalyst and the temperature of the exhaust gas flowing into the NSR catalyst increase. Thus, the specified amount Anox may be determined on the basis of the bed temperature Tnsr and the measurement value of the first exhaust temperature sensor 8.

FIG. 7 is a timing chart illustrating time-based changes in the air-fuel ratio (A/F) of the air-fuel mixture, the bed temperature (Tnsr) of the NSR catalyst, the amount of $NO_X$ flowing into the NSR catalyst (the NSR inflow $NO_X$ amount), the amount of $NO_X$ flowing out of the NSR catalyst (the NSR outflow $NO_X$ amount), the $NH_3$ adsorption amount (Σnh3) of the SCR catalyst, a fuel supply flag (Fadd), and the amount of $NO_X$ flowing out of the SCR catalyst (the SCR outflow $NO_X$ amount) in this embodiment. The "fuel supply flag Fadd" described herein is a flag that is turned ON in the case where the fuel is intermittently supplied from the fuel supply valve 17 such that the concentration of hydrocarbon in the exhaust gas flowing into the NSR catalyst fluctuates with the specified amplitude and in the specified cycle.

Similarly to FIG. 3 described above, at t2 in FIG. 7, the lean operation restart request is made, the bed temperature Tnsr of the NSR catalyst is higher than the storage limit temperature T2, and the $NH_3$ adsorption amount Σnh3 of the SCR catalyst is smaller than the lower limit adsorption amount Σnh3thre. Here, the bed temperature Tnsr of the NSR catalyst is equal to or lower than the specified threshold Tthre, and the NSR inflow $NO_X$ amount is smaller than the specified amount Anox. Thus, in the example shown in FIG. 7, when the lean operation restart request is made (t2 in FIG. 7), the air-fuel ratio A/F of the air-fuel mixture is changed from the rich air-fuel ratio A/F1 to the lean air-fuel ratio A/Flean, and thus, the operation state of the internal combustion engine 1 is shifted from the rich operation state to the lean operation state. Further, the fuel supply flag Fadd is switched from OFF to ON, and thus, the fuel is intermittently supplied from the fuel supply valve 17 such that the concentration of hydrocarbon in the exhaust gas flowing into the NSR catalyst fluctuates with the specified amplitude and in the specified cycle. As a result, in the case where the bed temperature Tnsr of the NSR catalyst is higher than the storage limit temperature T2 immediately after the operation state of the internal combustion engine 1 is shifted from the rich operation state to the lean operation state, $NO_X$ discharged from the internal combustion engine 1 is not stored in the NSR catalyst, but is reduced to $N_2$ by the reducing intermediate produced by the NSR catalyst. Consequently, the NSR outflow $NO_X$ amount immediately after shifting of the operation state of the internal combustion engine 1 from the rich operation state to the lean operation state becomes substantially zero, and accordingly, the SCR outflow $NO_X$ amount also becomes substantially zero.

In the case where the bed temperature Tnsr of the NSR catalyst becomes equal to or lower than the storage limit temperature T2 (t30 in FIG. 7) after the operation state of the internal combustion engine 1 is shifted from the rich operation state to the lean operation state, the fuel supply flag Fadd is set to OFF from ON. Thus, the fuel supply valve 17 stops supplying the fuel. From t30 onward in FIG. 7, $NO_X$ discharged from the internal combustion engine 1 is stored in the NSR catalyst, and therefore, the NSR outflow $NO_X$ amount becomes substantially zero, and accordingly, the SCR outflow $NO_X$ amount is maintained to be substantially zero.

The operation state of the internal combustion engine 1 is controlled in the procedure described with reference to FIG. 7. In this case, even in the case where the bed temperature Tnsr of the NSR catalyst is higher than the storage limit temperature T2 and the $NH_3$ adsorption amount Σnh3 of the SCR catalyst is smaller than the lower limit adsorption amount Σnh3thre at the time when the lean operation restart request is made, the increase in the $NO_X$ amount discharged to the atmosphere can be restrained, and the operation state of the internal combustion engine 1 can be promptly shifted from the rich operation state to the lean operation state, when the bed temperature Tnsr of the NSR catalyst is equal to or lower than the specified threshold Tthre and the NSR inflow $NO_X$ amount is equal to or smaller than the specified amount Anox. In the case where the bed temperature Tnsr of the NSR catalyst is higher than the storage limit temperature T2 and the $NH_3$ adsorption amount Σnh3 of the SCR catalyst is smaller than the lower limit adsorption amount Σnh3thre at the time when the lean operation restart request is made, the internal combustion engine 1 may perform the rich operation with the air-fuel mixture at the slightly rich air-fuel ratio A/F2 according to a procedure that is the same as or similar to the procedure in FIG. 3 when the bed temperature Tnsr of the NSR catalyst is higher than the specified threshold Tthre or the NSR inflow $NO_X$ amount is larger than the specified amount Anox. Thereafter, when the $NH_3$ adsorption amount of the SCR catalyst is increased to be equal to or larger than the lower limit adsorption amount Σnh3thre, or when an execution condition for the fuel supply processing (i.e., the condition that the bed temperature Tnsr of the NSR catalyst is equal to or lower than the specified threshold Tthre and the NSR inflow $NO_X$ amount Anoxin is equal to or smaller than the specified amount Anox) is satisfied, the operation state of the internal combustion engine 1 may be shifted from the rich operation state to the lean operation state.

A description will hereinafter be provided on a procedure of restarting the lean operation of the internal combustion engine 1 in this embodiment with reference to FIG. 8. FIG. 8 is a flowchart of a processing routine that is executed by the ECU 7 when the operation state of the internal combustion engine 1 is shifted from the rich operation state to the lean operation state in this embodiment. In the processing routine shown in FIG. 8, the same processing as that in the above-described processing routine shown in FIG. 4 will be denoted by the same reference numerals.

In the processing routine shown in FIG. 8, if the positive determination is made in the processing of S106, the ECU 7 executes processing in S201. In the processing of S201, the ECU 7 determines whether the bed temperature Tnsr of the NSR catalyst, which is acquired in the processing of S103, is higher than the specified threshold Tthre. In the case where a positive determination is made in S201 (Tnsr>Tthre), it is difficult to clean, i.e., reduce $NO_X$ in the exhaust gas with the use of the NSR catalyst even when the fuel is intermittently supplied from the fuel supply valve 17 such that the concentration of hydrocarbon in the exhaust gas flowing into the NSR catalyst fluctuates with the specified amplitude and in the specified cycle. Thus, if the positive determination is made in the processing of S201, the ECU 7 executes the processing of S107 such that the rich operation of the internal combustion engine 1 continues. On the other hand, if a negative determination is made in the processing of S201 (Tnsr≤Tthre), the processing proceeds to S202.

In the processing of S202, the ECU 7 determines whether the NSR inflow $NO_X$ amount Anoxin is equal to or larger than the specified amount Anox. As described above, the specified amount Anox at the time is determined on the basis of the bed temperature Tnsr of the NSR catalyst and the measurement value of the first exhaust temperature sensor 8. More specifically, the specified amount Anox may be set to a smaller value as the bed temperature Tnsr of the NSR catalyst and the measurement value of the first exhaust temperature sensor 8 increase. In the case where a positive determination is made in the processing of S202 (Anoxin>Anox), it is difficult to clean, i.e., reduce $NO_X$ in the exhaust gas with the use of the NSR catalyst even when the fuel is intermittently supplied from the fuel supply valve 17 such that the concentration of hydrocarbon in the exhaust gas flowing into the NSR catalyst fluctuates with the specified amplitude and in the specified cycle. Thus, if the positive determination is made in the processing of S202, the ECU 7 executes the processing of S107 such that the rich operation of the internal combustion engine 1 continues, as in the case where the positive determination is made in the processing of S201 described above. In the case where a negative determination is made in the processing of S202 (Anoxin≤Anox), the bed temperature Tnsr of the NSR catalyst is higher than the storage limit temperature T2, and the $NH_3$ adsorption amount Σnh3 of the SCR catalyst is smaller than the lower limit adsorption amount Σnh3thre, however, the bed temperature Tnsr of the NSR catalyst is equal to or lower than the specified threshold Tthre, and the NSR inflow $NO_X$ amount is equal to or smaller than the specified amount Anox. Thus, in the case where the concentration of hydrocarbon in the exhaust gas flowing into the NSR catalyst fluctuates with the specified amplitude and in the specified cycle, $NO_X$ discharged from the internal combustion engine 1 can be cleaned, i.e., reduced by the NSR catalyst even when the operation state of the internal combustion engine 1 is shifted from the rich operation state to the lean operation state. Thus, if the negative determination is made in the processing of S202, the ECU 7 executes the processing of S203 and S204.

In the processing of S203, the ECU 7 sets the fuel supply flag Fadd to ON. Next, the processing proceeds to S204, and the ECU 7 changes the air-fuel ratio A/F of the air-fuel mixture from the rich air-fuel ratio A/F1 to the lean air-fuel ratio A/Flean. Thus, the operation state of the internal combustion engine 1 is shifted from the rich operation state to the lean operation state. When the processing of S203 and S204 is thus executed, the fuel is intermittently supplied from the fuel supply valve 17 such that the concentration of hydrocarbon in the exhaust gas flowing into the NSR catalyst fluctuates with the specified amplitude and in the specified cycle, and the operation state of the internal combustion engine 1 is shifted from the rich operation state to the lean operation state. As a result, in the case where the bed temperature Tnsr of the NSR catalyst is higher than the storage limit temperature T2 immediately after the operation state of the internal combustion engine 1 is shifted from the rich operation state to the lean operation state, $NO_X$ discharged from the internal combustion engine 1 is not stored in the NSR catalyst, but is reduced to $N_2$ by the reducing intermediate produced in the NSR catalyst. Consequently, the NSR outflow $NO_X$ amount can be maintained to be substantially zero, and accordingly, the SCR outflow $NO_X$ amount can be also maintained to be substantially zero.

After the ECU 7 finishes executing the processing of S203 and S204, the processing returns to S103. Then, if the bed temperature Tnsr of the NSR catalyst, which is reacquired in the processing of S103, becomes equal to or lower than the storage limit temperature T2, the negative determination is made in the processing of S104. In such a case, before executing the processing of S108, the ECU 7 executes the processing of S205. In the processing of S205, the ECU 7 sets the fuel supply flag Fadd to OFF. In this way, the intermittent fuel supply from the fuel supply valve 17 is terminated. However, since $NO_X$ discharged from the internal combustion engine 1 is stored in the NSR catalyst, the NSR outflow $NO_X$ amount and the SCR outflow $NO_X$ amount are maintained to be substantially zero.

According to the embodiment that has been described so far, even in the case where the bed temperature Tnsr of the NSR catalyst is higher than the storage limit temperature T2 and the $NH_3$ adsorption amount Σnh3 of the SCR catalyst is smaller than the lower limit adsorption amount Σnh3thre at the time when the lean operation restart request is made, the increase in the $NO_X$ amount exhausted to the atmosphere can be restrained, and the operation state of the internal combustion engine 1 can be promptly shifted from the rich operation state to the lean operation state when the bed temperature Tnsr of the NSR catalyst is equal to or lower than the specified threshold Tthre and the NSR inflow $NO_X$ amount is equal to or smaller than the specified amount Anox. That is, it is possible to reduce occurrence of a situation where the restart of the lean operation of the internal combustion engine 1 is restricted when the lean operation restart request is made.

What is claimed is:

1. An exhaust gas control apparatus for an internal combustion engine comprising:
   a $NO_X$ storage reduction catalyst that is disposed in an exhaust passage of the internal combustion engine, the $NO_X$ storage reduction catalyst being configured to store $NO_X$, contained in exhaust gas supplied by the internal combustion engine when an air-fuel ratio of the exhaust gas is a lean air-fuel ratio, and to reduce stored $NO_X$, with use of a reducing agent in the exhaust gas when the air-fuel ratio of the exhaust gas is a rich air-fuel ratio;
   a selective catalytic reduction catalyst that is disposed downstream of the $NO_X$ storage reduction catalyst in the exhaust passage, the selective catalytic reduction catalyst being configured to adsorb $NH_3$ in the exhaust gas, and to use adsorbed $NH_3$ as the reducing agent so as to reduce $NO_X$ in the exhaust gas; and
   an electronic control unit configured
      i) to acquire a temperature of the $NO_X$ storage reduction catalyst,
      ii) to acquire an $NH_3$ adsorption amount that is an amount of $NH_3$ adsorbed on the selective catalytic reduction catalyst,
      iii) to shift an operation state of the internal combustion engine from a rich operation state in which air-fuel mixture at the rich air-fuel ratio is burned to a lean operation state in which the air-fuel mixture at the lean air-fuel ratio is burned, in a case where the acquired temperature of the $NO_X$ storage reduction catalyst is higher than a storage limit temperature, and the acquired $NH_3$ adsorption amount is equal to or larger than a lower limit adsorption amount when a lean operation restart request to shift the operation state of the internal combustion engine from the rich operation state to the lean operation state is made, the storage limit temperature being an upper limit value of a temperature range within which $NO_X$ in the exhaust gas is stored by the $NO_X$ storage reduction catalyst, and the lower limit adsorption amount being an amount of $NH_3$ equivalent to an amount of $NO_X$ discharged from the internal combustion engine, and iv) not to shift the operation state of the internal combustion engine from the rich operation state to the lean operation state in a case where the acquired temperature of the $NO_X$ storage reduction catalyst is higher than the storage limit temperature and the acquired $NH_3$ adsorption amount is smaller than the lower limit adsorption amount when the lean operation restart request is made.

2. The exhaust gas control apparatus for the internal combustion engine according to claim 1, wherein the electronic control unit is further configured to shift the operation state of the internal combustion engine from the rich operation state to the lean operation state in a case where the acquired temperature of the $NO_X$ storage reduction catalyst is equal to or lower than the storage limit temperature when the lean operation restart request is made.

3. The exhaust gas control apparatus for the internal combustion engine according to claim 1 further comprising a fuel supply valve that is disposed upstream of the $NO_X$ storage reduction catalyst in the exhaust passage, the fuel supply valve being configured to supply fuel to the exhaust gas flowing through the exhaust passage, wherein the electronic control unit is configured to control a fuel supply amount and fuel supply timing of the fuel supply valve, and to shift the operation state of the internal combustion engine from the rich operation state to the lean operation state and to control the fuel supply valve such that a concentration of hydrocarbon in the exhaust gas flowing into the $NO_X$ storage reduction catalyst fluctuates with a specified amplitude and in a specified cycle in a case where the acquired temperature of the $NO_X$ storage reduction catalyst is equal to or lower than a specified threshold that is higher than the storage limit temperature, and the amount of $NO_X$ discharged from the internal combustion engine is equal to or smaller than a specified amount, even in a state where the acquired temperature of the $NO_X$ storage reduction catalyst is higher than the storage limit temperature and the acquired $NH_3$ adsorption amount is smaller than the lower limit adsorption amount when the lean operation restart request is made.

4. The exhaust gas control apparatus for the internal combustion engine according to claim 3, wherein the specified amount is a maximum $NO_X$ amount or an amount obtained by subtracting a specified margin from the maximum $NO_X$ amount, the maximum $NO_X$ amount being a maximum amount of $NO_X$ that is able to be reduced by the $NO_X$ storage reduction catalyst when the fuel supply valve is controlled such that the concentration of hydrocarbon in the exhaust gas flowing into the $NO_X$ storage reduction catalyst fluctuates with the specified amplitude and in the specified cycle.

5. The exhaust gas control apparatus for the internal combustion engine according to claim 1, further comprising a $NO_X$ sensor that is disposed between the $NO_X$ storage reduction catalyst and the selective catalytic reduction catalyst in the exhaust passage, the $NO_X$ sensor being configured to detect a concentration of $NO_X$ in the exhaust gas flowing into the exhaust passage, wherein the electronic control unit is configured to acquire the $NH_3$ adsorption amount of the selective catalytic reduction catalyst based on a detection value of the $NO_X$ sensor.

* * * * *